United States Patent Office 3,385,894
Patented May 28, 1968

3,385,894
OXIDATION OF ACTIVATED METHYLENE GROUP CONTAINING COMPOUNDS TO THE CORRESPONDING CARBONYL COMPOUNDS
Edgar Schipper, Clifton, N.J., assignor to Shulton, Inc., Clifton, N.J., a corporation of New Jersey
No Drawing. Filed June 30, 1965, Ser. No. 468,639
3 Claims. (Cl. 260—590)

ABSTRACT OF THE DISCLOSURE

The process is described for the oxidation of compounds containing activated methylene groups to form the corresponding carbonyl compounds using chlorine or bromine in the presence of at least a molar excess of a dialkyl sulfoxide such as dimethyl sulfoxide.

---

This invention relates to novel oxidation processes and more particularly, it relates to the oxidation of compounds containing one or more activated methylene groups as to form carbonyl compounds.

It is frequently desirable to oxidize certain portions of molecules of organic substances without substantially affecting other groups already contained in the substances. For example, 1,2,3-indanetrione-2-hydrate, or ninhydrin, is a constituent of the coating utilized to sensitize papers for use in the thermographic reproduction process. The thermographic reproduction process utilizes heat-sensitive papers for making copies of documents and the like. Where the areas of the coated paper are heated to an elevated temperature in the range of from about 50° to about 150° C. to correspond to lines on an original, a permanent color change is produced, so that by suitable equipment arrangements a facsimile of the original is obtained.

Ninhydrin is a preferred keto compound which acts as a dye precursor with other materials coated on thermographic copy paper to produce the final image. Such methods as are available to synthesize this valuable compound are generally unsatisfactory. In the best known process for the preparation of ninhydrin, 1,3-indanedione is nitrated at the 2-position and the resulting nitro compound is then brominated and heated, for example, in o-dichlorbenzene at about 180° C. whereupon it undergoes decomposition to give equal parts of the indane-1,2,3-trione and 2,2-dibromo-indane-1,3-dione. The trione on recrystallization from water forms the hydrated ninhydrin. The process is unsatisfactory for the reason that 50% of the initial indane-1,3-dione is converted to the dibromo compound. The theoretical yield therefore of ninhydrin is only 50% and the actual yield is considerably less than 50%.

It has now been discovered that this compound can be simply and efficiently produced by direct oxidation of 1,3-indanedione which contains an activated methylene group at the 2-position utilizing a dilower alkyl sulfoxide and either bromine or chlorine as the oxidizing system. The process is generally applicable to the oxidation of activated methyl or methylene groups to produce carbonyl compounds, i.e. aldehydes and ketones.

For convenience, activated methyl and methylene groups will be referred to as activated methylene groups, the methyl group being regarded as a methylene group where one position is occupied by a hydrogen atom. As used herein, "activated" is taken to mean that the methylene group has a significantly electropositive polarity. This activation is caused by the presence of an electrophilic group adjacent to the methylene group. The strongest activation is caused by presence of one or two electrophilic groups immediately adjacent to the methylene group. Examples of such electrophilic groups are the nitro, cyano, aza, carbonyl, carbamido, carboalkoxy, aryl and carboxy groups and the like. Such electrophilic groups are considered to be activating for purposes of this invention. Activated methylene groups are more acidic than non-activated groups and form anions more readily.

The activated methylene group is treated with at least a molar excess of a dialkyl sulfoxide in the presence of a halogen. The alkyl groups of the dialkyl sulfoxide suitably contain up to four carbon atoms per alkyl group. While the alkyl groups can be the same or different, dialkyl sulfoxides in which both alkyl groups are the same are generally preferable because of their economy. In practical reactions utilizing the process of this invention, dimethyl sulfoxide is especially preferred because it is more readily available.

At least a molar excess of dialkyl sulfoxide based on the moles of activated, oxidizable methylene groups is used in the process of this invention. More particularly, it is preferred to use a substantial molar excess of from about 10 to about 40 moles of the sulfoxide for each oxidizable methylene group. For example, if 1,3-indanedione is to be reacted to produce the 1,2,3-trione-hydrate or if α-picoline is to be oxidized to 2-pyridinecarboxaldehyde, from about 10 to about 40 moles of the sulfoxide would be used for each mole of the dione or picoline, respectively.

The preferred halogens used in the process of this invention are bromine and chlorine. They are preferably added in their elemental form to the reaction mixture, containing the sulfoxide and the compound to be oxidized. For ease of handling and because of better yields and a generally more satisfactory process, bromine is the preferred halogen for use in this invention. Generally, it has been found that much less halogen than dialkyl sulfoxide is required. Preferably, from about 0.25 to about 1.0 moles of halogen per mole of activated, oxidizable methylene group are used for each mole of material to be oxidized.

If desired, other materials can be present in the reaction mixture. More particularly, a solvent can be used in addition to the sulfoxide. It will be understood that where a solvent or other material is used, it should be inert to the methylene-containing material, the sulfoxide, and the halogen and should not enter into any reaction. Generally, the solvent is a halogenated hydrocarbon. Since the sulfoxides themselves are excellent solvents for many organic materials, it is preferred to use the sulfoxide alone without any additional solvent or other material.

This reaction can be carried out over a wide range of temperatures. At low temperatures the reaction proceeds slowly, and at very low temperatures the reaction mixture may solidify; while at greatly elevated temperatures the reactants tend to boil off. The latter problem can be obviated by carrying out the reaction under superatmospheric pressures up to the temperature at which the reactants begin to decompose. For simplicity of operation, the reaction is preferably carried out at normal ambient atmospheric pressure. The best balance between speed of reaction, freedom from side reactions, and ease of handling is obtained in the preferred temperature range of from about 25° to about 90° C. In the preferred embodiments, the activated methylene-containing material is dissolved in the sulfoxide and the halogen is added to the solution. The reaction is exothermic, and the temperature will spontaneously increase to about 30–40° C. during the addition of halogen. The halogen addition preferably takes place over a period of from about 2 to about 3 hours. During the addition of the halogen the reaction mixture may be exposed to ultraviolet light as a reaction promoter. At the end of this period the reaction mixture is preferably heated to an elevated temperature in the range of from about 70° C. to about 90° C. and held at this temperature for an additional 1 to 2 hours.

At the end of the reaction period the sulfoxide is removed from the reaction mixture, preferably together with any dialkyl sulfide formed. The method of removal of the sulfoxide is not critical. It is preferably evaporated from the reaction mixture by heating. With some reactants, there may be a possibility of an explosion if the sulfoxide is evaporated at atmospheric pressure, and accordingly, it is perferred in such instances that the sulfoxide be removed under sub-atmospheric pressures. A preferred pressure for the removal of sulfoxide is on the order of from about 1 to about 5 mm. Hg.

The reaction product can be readily recovered by conventional means. Often a molecular complex forms between the reaction product and the excess sulfoxide. This product is readily decomposed by digesting with hot water, preferably in the presence of a small amount of mineral acid. This is conveniently accomplished by digesting the product with boiling water with or without mineral acid for from about one to two hours utilizing about 100 ml. of water for each 10 g. of original reaction mixture. The digestion is preferably accomplished as a part of a steam distillation procedure which is continued until substantially all of the excess sulfoxide and any dialkyl sulfide which forms is distilled over. The mixture containing the product may be decolorized with charcoal, which is removed by filtration. The filtrate is cooled to crystallize the product. This process is especially suitable with products which are soluble in hot water. If desired the filtrate can be further purified by extraction of impurities with an organic solvent such as benzene or toluene subsequent to decolorization and before crystallization.

With products which are insoluble in both hot and cold water other procedures such as direct filtration of the digested mixture or extraction can be employed. These procedures are illustrated in the examples.

Where ninhydrin is produced, the product is found to crystallize adequately from the aqueous medium at a temperature on the order of about 5° C. The reaction product is generally about 92–97% pure and can further be purified by conventional techniques such as recrystallization. In the case of ninhydrin production, it is preferred further to purify the material by recrystallization from benzene which contains up to about 3% water. The purpose of the water in this preferred embodiment of the invention is to prevent dehydration of the ninhydrin to the trione. In preferred embodiments of this invention, the yield of products ranges normally above 35% and often higher than 50%. It will vary according to the specific reaction mixture, the product sought, and quantities and proportions of reactants. For example, if 10 moles of sulfoxide is used to prepare ninhydrin, the yield is about 20%; while if 40 moles of the sulfoxide is used, the yield rises to about 50%. Unless otherwise indicated, all parts, proportions, and percentages herein are by weight.

The following examples are given to illustrate some embodiments of this invention, but they do not define the entire scope of the invention:

Example I

A 2.73 g. (0.017 mole) quantity of bromine is added dropwise to a continuously stirred solution of 10 g. (0.068 mole) of 1,3-indanedione in 100 ml. (110 g., 1.41 mole) of dimethyl sulfoxide. After addition of the bromine is complete, the mixture is stirred for 2 hours at room temperature and then for 2 hours at 70° C.

The reaction mixture so obtained is vacuum distilled at 1 mm. Hg until all of the dimethyl sulfide and dimethyl sulfoxide is removed. The residue is dissolved in 150 ml. of water containing 3 ml. of concentrated hydrochloric acid, and the mixture is heated on a steam bath for one hour. Charcoal is then stirred with the mixture and the mixture is filtered.

The filtrate is concentrated to one-third of its original volume and the concentrate held over-night in a refrigerator. The crystals of ninhydrin which form are removed from the supernatant liquid by filtration and are found to have a melting point of 240–242° C. The yield of ninhydrin is 50%.

Examples 2, 3, 4 and 5 summarized in the following table illustrate the process of the invention using varying quantities of halogen and dimethyl sulfoxide per mole of 1, 3-indanedione under the reaction conditions of Example I. In each example, .068 moles of indanedione is used.

| Example | Moles of Bromine | Ratio | Moles of DMSO | Ratio | Yield, Percent |
| --- | --- | --- | --- | --- | --- |
| 2 | 0.017 | .25:1 | 0.7 | 10.3:1 | 21 |
| 3 | 0.017 | .25:1 | 2.82 | 41.2:1 | 50 |
| 4 | 0.034 | .50:1 | 1.41 | 20.6:1 | 42 |
| 5 | 0.068 | 1.0:1 | 1.41 | 20.6:1 | 59 |

Example VI

The procedure of Example I is repeated except that after decolorization with charcoal the filtrate is extracted with several 100 ml. portions of ethyl acetate. The combined extracts are dried over anhydrous magnesium sulfate, filtered and evaporated in vacuo to leave the desired product as a residue. The yield is somewhat less than in Example I.

Example VII

A 10.9 g. (0.068 mole) quantity of bromine is added dropwise to a continuously stirred solution of 10 g. (0.068 mole) of 1,3-indanedione in 100 ml. (110 g., 1.41 moles) dimethyl sulfoxide and 100 ml. of chloroform. After addition of the bromine is completed, the mixture is stirred for 2 hours at room temperature and then for 2 hours at a temperature of 70° C.

The reaction mixture is then subjected to vacuum distillation at a pressure of one mm. Hg until all the dimethyl sulfide and dimethyl sulfoxide are removed. The residue is taken up in 150 ml. of water containing 3 ml. of concentrated hydrochloric acid, and the mixture is heated on a steam bath for one hour. Charcoal is slurried with the mixture and the mixture is filtered.

The filtrate is concentrated to one-third of its original volume, and the concentrate is allowed to stand overnight in a refrigerator. Crystals of ninhydrin with a melting point of 240–242° C. are filtered off. The yield of ninhydrin is 12%.

Carbon tetrachloride at a temperature of 90° C. is used in the procedure of this example in place of the chloroform, but the yield is somewhat decreased.

Example VIII

A 4.8 g. (0.068 mole) quantity of gaseous chlorine is introduced into a continuously stirred solution of 10 g. (0.068 mole) of 1,3-indanedione in 100 ml. (110 g., 1.41 moles) of dimethyl sulfoxide. The chlorine is added at a rate such that the temperature of the solution does not exceed 40° C. After addition of the chlorine is completed the mixture is stirred for 4 hours at room temperature and then for 3 hours at 70° C.

The reaction mixture is then subjected to vacuum distillation at a pressure of 1 mm. Hg until all dimethyl sulfide and dimethyl sulfoxide are removed. The residue is taken up in 150 ml. of concentrated hydrochloric acid, and this mixture is heated in a steam bath for one hour. Charcoal is slurried in the mixture and the slurry is filtered to decolorize the product.

The filtrate is concentrated to about one-third of its volume, and the concentrate is permitted to stand in a refrigerator overnight. The resulting crystals of ninhydrin having a melting point of 240–242° C. are filtered off. Ninhydrin is obtained in a yield of about 9%.

Example IX

A 2.73 g. (0.017 mole) quantity of bromine is added dropwise to a continuously stirred solution of 10 g. (9.068 mole) of 1,3-indanedione in 100 ml. (110 g., 1.4 moles) dimethyl sulfoxide. After the addition of bromine is completed the mixture is stirred for 2 hours at room temperature and then for 2 hours at 70° C.

A 150 ml. quantity of water containing 3 ml. of concentrated hydrochloric acid is then added to the reaction mixture, and it is subjected to steam distillation until all the dimethyl sulfide and dimethyl sulfoxide have been removed. The residual solution is then decolorized with charcoal and filtered.

The filtrate is concentrated to about one-third of its original volume and the concentrate is allowed to stand overnight in a refrigerator. Ninhydrin crystals with a melting point of 240–242° C. are filtered off. The yield of ninhydrin is 52%.

Example X

A 2.73 g. (0.017 mole) quantity of bromine is added dropwise to a continuously stirred solution of 10 g. (0.068 mole) of 1,3-indanedione in 100 ml. (110 g., 1.4 moles) of dimethyl sulfoxide. After the addition of the bromine is completed, the mixture is stirred for 2 hours at room temperature and then for 2 hours at 70° C.

Then 200 ml. of water are added, and the mixture is distilled at a reduced pressure of 10–15 mm. Hg. The residual mass is taken up in 150 ml. of water containing 3 ml. of concentrated hydrochloric acid, heated on a steam bath for 1 hour, treated with charcoal, and filtered.

The filtrate is then concentrated to one-third of its original volume and the concentrate is allowed to stand overnight in a refrigerator. The crystals of ninhydrin so formed have a melting point of 240–242° C. and are obtained in a 47% yield.

Example XI

A 2.73 g. quantity of bromine is added dropwise to a continuously stirred solution of 10 g. of 1,3-indanedione in 100 ml. of dimethyl sulfoxide. After the addition of the bromine is completed the mixture is stirred for 2 hours at room temperature and then for 2 hours at 70° C.

The reaction mixture is then subjected to vacuum distillation at a pressure of 1 mm. Hg until all of the dimethyl sulfide and dimethyl sulfoxide have been removed. The residue is taken up in 150 ml. of water containing 3 ml. of concentrated hydrochloric acid, and the mixture is then heated on a steam bath for 1 hour. Charcoal is slurried in the mixture, which is then filtered. The filtrate is extracted with 100 ml. of hot toluene further to remove colored impurities.

The washed aqueous layer is concentrated to about one-third of its original volume and the concentrate is allowed to stand overnight in a refrigerator. Ninhydrin crystals having a melting point of 240–242° C. are obtained in 45% yield.

Example XII

A 3.14 g. (0.02 mole) quantity of bromine is added dropwise which continuous stirring to a solution containing 10 g. (0.06 mole) of diphenylmethane in 115 ml. (126.5 g., 1.62 moles) of dimethyl sulfoxide. After the addition is completed, the reaction mixture is stirred at room temperature for 1 hour and then heated at 80° C. for 4 hours.

The reaction mixture is then vacuum-distilled at 2 mm. Hg to remove the dimethyl sulfoxide and dimethyl sulfide, and the residue is dissolved in 150 ml. of water. The resulting solution is heated on a steam bath for 2 hours and then extracted with ethyl ether.

The ether extract is then dried, and the ether is evaporated to leave the desired benzophenone as a residue.

Example XIII

A 6.55 g. (0.041 mole) quantity of bromine is added dropwise with continuous stirring to 10 g. (0.083 mole) of acetophenone in 100 ml. (110 g., 1.41 moles) of dimethyl sulfoxide. The reaction mixture is kept at room temperature for 2.5 hours and then heated to about 90° C. for 2 hours.

Excess dimethyl sulfoxide and dimethyl sulfide are removed by vacuum distillation. The residue is diluted with 150 ml. of water and the aqueous suspension is heated on a steam bath for 1 hour. The suspension is extracted with ethyl acetate, and the extract is dried and distilled.

The fraction with a boiling point at 1 mm. Hg of 81–83° C. is collected and converted into the solid phenylglyoxal hydrate by heating on a steam bath for 4 hours with 150 ml. of water. The product is recovered by filtration after concentrating to one-half volume and cooling.

Example XIV

A 4.8 g. (0.068 mole) quantity of gaseous chlorine is introduced into a continuously stirred solution of 10 g. (0.068 mole) of 1,3-indanedione in 229 g. (1.41 mole) of dibutyl sulfoxide. The chlorine is added at a rate such that the temperature of the solution does not exceed 40° C. After addition of the chlorine is completed the mixture is stirred for 4 hours at room temperature and then for 3 hours at 70° C.

The reaction mixture is then subjected to vacuum distillation at a pressure of 1 mm. Hg until all the dibutyl sulfide and dibutyl sulfoxide are removed. The residue is taken up in 150 ml. of concentrated hydrochloric acid, and this mixture is heated in a steam bath for one hour. Charcoal is slurried in the mixture and the slurry is filtered to decolorize the product.

The filtrate is concentrated to about one-third of its volume, and the concentrate is permitted to stand in a refrigerator overnight. The resulting crystals of ninhydrin having a melting point of 240–242° C. are filtered off.

Example XV

A 2.73 g. (0.017 mole) quantity of bromine is added dropwise to a continuously stirred solution of 10 g. (0.068 mole) of 1,3-indanedione in 229 g. (1.41 moles) of dibutyl sulfoxide. After the addition of bromine is completed, the mixture is stirred for 2 hours at room temperature and then for 2 hours at 70° C.

A 150 ml. of quantity of water containing 3 ml. of concentrated hydrochloric acid is then added to the reaction mixture, and it is subjected to steam distillation until all the dibutyl sulfide and dibutyl sulfoxide have been removed. The residual solution is then decolorized with charcoal and filtered.

The filtrate is concentrated to about one-third of its original volume and the concentrate is allowed to stand overnight in a refrigerator. Ninhydrin crystals with a melting point of 240–242° C. are filtered off.

What is claimed is:

1. An oxidation process which comprises reacting an activated methylene group containing compound selected from the group consisting of 1,3-indanedione, diphenylmethane and acetophenone with at least a molar excess of a dialkyl sulfoxide carrying up to four carbon atoms per alkyl group at a temperature of from about 25° C. to about 90° C. in the presence of from about 0.25 to about one mole of a halogen selected from the group consisting of bromine and chlorine to oxidize the methylene group and form the corresponding carbonyl compound.

2. A process as in claim 1 in which the dialkyl sulfoxide is dimethyl sulfoxide.

3. A process as in claim 2 in which from about 10 to about 40 moles of dimethyl sulfoxide per mole of activated methylene group is utilized.

References Cited

FOREIGN PATENTS 1,035,180 6/1965 Great Britain.
703,012 2/1964 Canada.

OTHER REFERENCES

Kornblum et al.: J. Am. Chem. Soc. 79, 6562 (1957).
Hunsberger et al.: Chem. Abstracts 53, 13050c (1959).
Mandoli et al.: Chem. Abstracts 54, 12074c (1960).
Fusco et al.: Chem. Abstracts 50, 13828f (1956).

DANIEL D. HORWITZ, *Primary Examiner.*